United States Patent
Gilling et al.

(10) Patent No.: US 10,990,455 B2
(45) Date of Patent: Apr. 27, 2021

(54) MANAGEMENT OF APPLICATION PROGRAMMING INTERFACE (API) RETENTION

(71) Applicant: Moesif, Inc., San Francisco, CA (US)

(72) Inventors: Derric Stephen Gilling, San Francisco, CA (US); Xingheng Timothy Wang, San Francisco, CA (US)

(73) Assignee: Moesif, Inc., San Francisco, CA (US)

( * ) Notice: Subject to any disclaimer, the term of this patent is extended or adjusted under 35 U.S.C. 154(b) by 0 days.

(21) Appl. No.: 16/575,084

(22) Filed: Sep. 18, 2019

(65) Prior Publication Data

US 2021/0081260 A1    Mar. 18, 2021

(51) Int. Cl.
| | | |
|---|---|---|
| *G06F 9/44* | (2018.01) | |
| *G06F 9/54* | (2006.01) | |
| *G06F 9/30* | (2018.01) | |
| *G06F 9/445* | (2018.01) | |

(52) U.S. Cl.
CPC .......... *G06F 9/541* (2013.01); *G06F 9/30021* (2013.01); *G06F 9/4451* (2013.01)

(58) Field of Classification Search
CPC ...................................................... G06F 9/541
USPC ......................................................... 719/318
See application file for complete search history.

(56) References Cited

U.S. PATENT DOCUMENTS

| | | | |
|---|---|---|---|
| 2017/0046374 A1* | 2/2017 | Fletcher | G06F 3/0482 |
| 2018/0253218 A1* | 9/2018 | Levesque | G06F 16/125 |

* cited by examiner

*Primary Examiner* — Timothy A Mudrick (57) ABSTRACT

Systems, methods, and software described herein manage and process application programming interface (API) statistics associated with an API provider. In one example, a monitoring service obtains API request information associated with API requests from API users to an API provider. The monitoring service determines time stamps for the API requests based on the API provider information and compares the time stamps to retention criteria for the API provider to determine a retention of the plurality of API users over time. The monitoring service further generates a summary based on the comparison.

20 Claims, 9 Drawing Sheets

| API USER GROUPS 710 | TIME PERIOD 720 | TIME PERIOD 721 | TIME PERIOD 722 | TIME PERIOD 723 | TIME PERIOD 724 |
|---|---|---|---|---|---|
| GROUP 730 | 100 | 100 | 95 | 90 | 90 |
| GROUP 731 | 100 | 100 | 100 | 100 | 100 |
| GROUP 732 | 100 | 95 | 85 | 85 | 85 |
| GROUP 733 | 95 | 95 | 55 | 50 | 45 |

TREND OF INTEREST 750

| DATE COLUMN 910 | USER TOTAL 920 | RETENTION PERCENTAGE COLUMNS 930 | | | |
|---|---|---|---|---|---|
| | | DAY 1 | DAY 2 | DAY 3 | DAY 4 |
| ALL | 150 | 100 | 80 | 82.5 | 75 |
| 1/1 | 50 | 100 | 100 | 80 | 75 |
| 1/2 | 25 | 100 | 85 | 85 | |
| 1/3 | 45 | 100 | 55 | | |
| 1/4 | 30 | 100 | | | |

MANAGEMENT OF APPLICATION PROGRAMMING INTERFACE (API) RETENTION

BACKGROUND

Web service application programming interfaces (APIs) are defined interfaces that permit interactions to occur between the service associated with the APIs and users of the APIs. These APIs may permit users to obtain data from the service associated with the API, post data to the service associated with the API, or provide some other data operation with relation to the service associated with the API. For example, a web service API may permit an eCommerce seller to obtain shipping information, such as cost estimates, from a shipping service provider. Thus, rather than locally importing and updating the information from the shipping service provider, the eCommerce seller may obtain the required information from one or more databases maintained by the shipping service provider.

However, although APIs may provide efficient access to data between different services, difficulties can occur in determining how the various end users interact with and use the APIs. These difficulties are often compounded when an API is available to large quantities of users, each with different functional reasons for using the API.

Overview

Provided herein are systems, methods, and software to monitor and identify retention trends in application programming interface (API) requests. In one example, a monitoring service may obtain API request information associated with API requests from an API user to an API provider, wherein the API request information indicates at least one or more API functions associated with each of the API requests. The monitoring service may further determine time stamps associated with the API requests and compare the time stamps of the API requests to at least one retention criterion. Once compared, the monitoring service may generate a retention summary based on the comparison.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
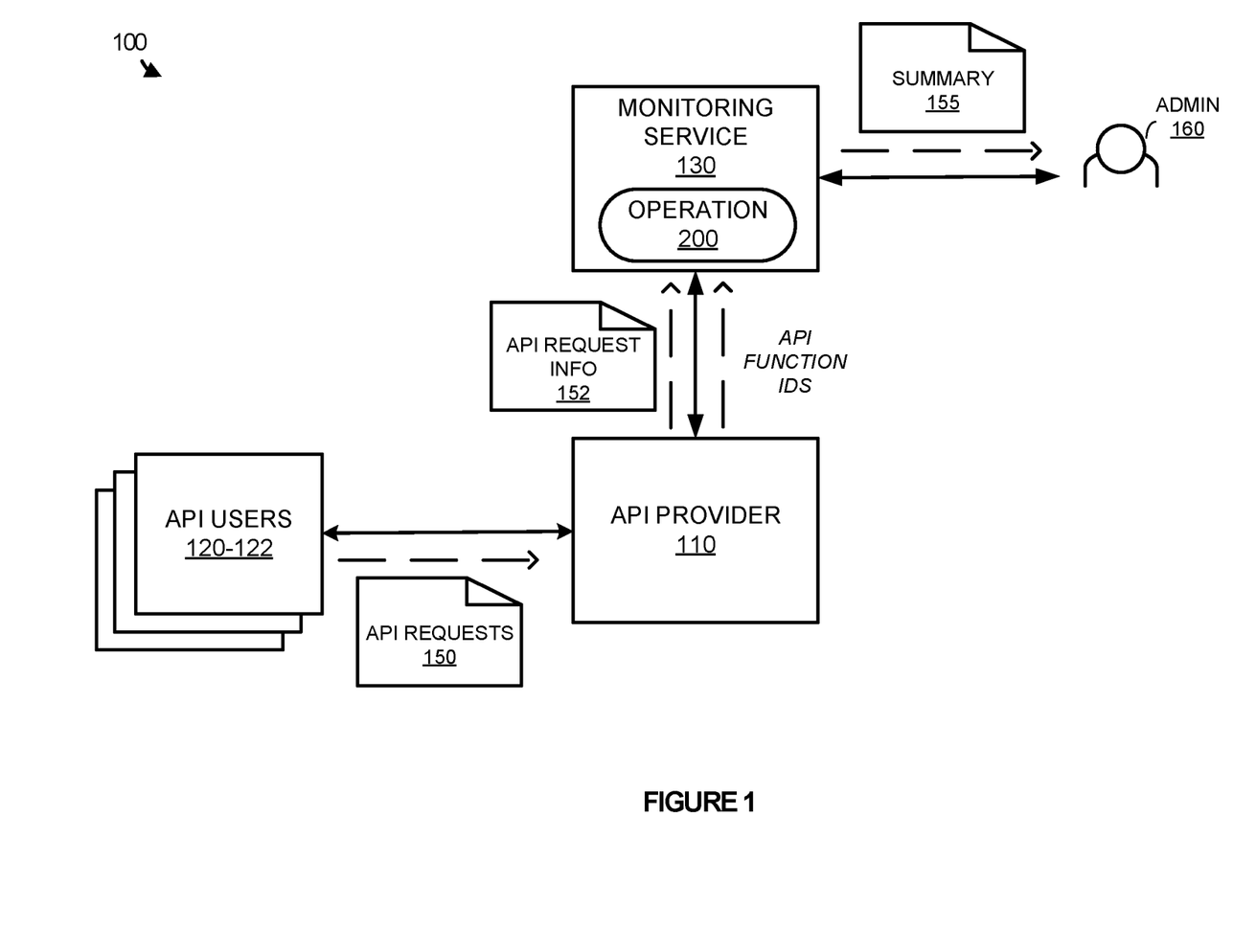
FIG. 1 illustrates a computing environment to manage application programming interface (API) statistics according to an implementation.

FIG. 1 illustrates a computing environment 100 to manage application programming interface (API) statistics according to an implementation. Computing environment 100 includes API users 120-122, API provider 110, monitoring service 130, and administrator 160. Computing environment 100 further includes API requests 150, API request information 152, and summary 155. Monitoring service 130 provides operation 200 that is further described below in FIG. 2.

In operation, API users 120-122 generate API requests 150 over a network connection to API provider 110, wherein the requests may be used to provide various functionality for the API users. API requests 150 may correspond to requests to retrieve information from a service provided by API provider 110, post information to a service provided by API provider 110, modify data stored by a service provided by API provider 110, or some other operation associated with API provider 110. As an example, an API request of API requests 150 may request a social media post corresponding to a user of a social media service provided by API provider 110. API users 120-122 may correspond to individual users, service providers, such as other web services, or some other user of a web API.

As API requests 150 are obtained by API provider 110, API request information 152 is provided to or extracted by monitoring service 130. This API request information 152 may include header information for the API requests obtained from API users 120-122. In some implementations, monitoring service 130 may extract header portions of the packets from API users 120-122 and relevant API attributes for the request from the header. The API attributes may include a user identifier associated with the API request, the API function included in the request, a time stamp associated with the request, or some other information related to the API request. Once the API attributes are extracted, the API attributes from the API requests may be used to generate various summaries of the API interactions with API provider 110.

In some implementations, as API request information 152 is obtained by monitoring service 130, monitoring service 130 may extract the API function identifiers used in the requests and associate the API function identifiers with a corresponding API user of API users 120-122. In some implementations, monitoring service 130 may further determine time stamps associated with each of the function requests and use the time stamps to identify API user retention associated with API provider 110.

In at least one example, monitoring service 130 may maintain criteria that can be compared to the API requests of API users 120-122 to determine whether an API user has been retained. For example, an administrator may define a first API function that is used to trigger the existence of a new user to the API provider and may define a second function that is used to determine when the user has returned to the API provider. The administrator may further define a time period for the use between the first API function and the second API function that can be used to indicate the retention of the user. The time period may comprise an hour, a day, a week, or some other time period. For example, an administrator may define criteria where a first API function used to obtain data from a database associated with API provider 110 and the second API function corresponds to the same function to obtain data from the database associated with API provider 110. The administrator may further indicate that when the first and second functions are used within a period of a day, the API user may be considered retained for that day by the API provider. After expiration of the day, the monitoring service may determine whether API requests are generated on the following days after the first day to determine whether the API user is retained for those following days.

After processing the API function requests associated with the API users and the retention of the API users, monitoring service 130 may generate a summary for at least one administrator associated with API provider 110. The summary may comprise a graph, a table, or some other data structure, a notification with statistical retention values, or some other information related to the retention of users to API provider 110, including combinations thereof. For example, monitoring service 130 may generate a graph that demonstrates the retention of users as a function of time that they have used API provider 110. In some examples, the data structure or other display element may indicate the quantity of requests associated with a relevant API function and API user as a function of time. Advantageously, the display may not only indicate the retention of the API users in general but may further indicate the quantity of requests from each of the users.

Figure 2:
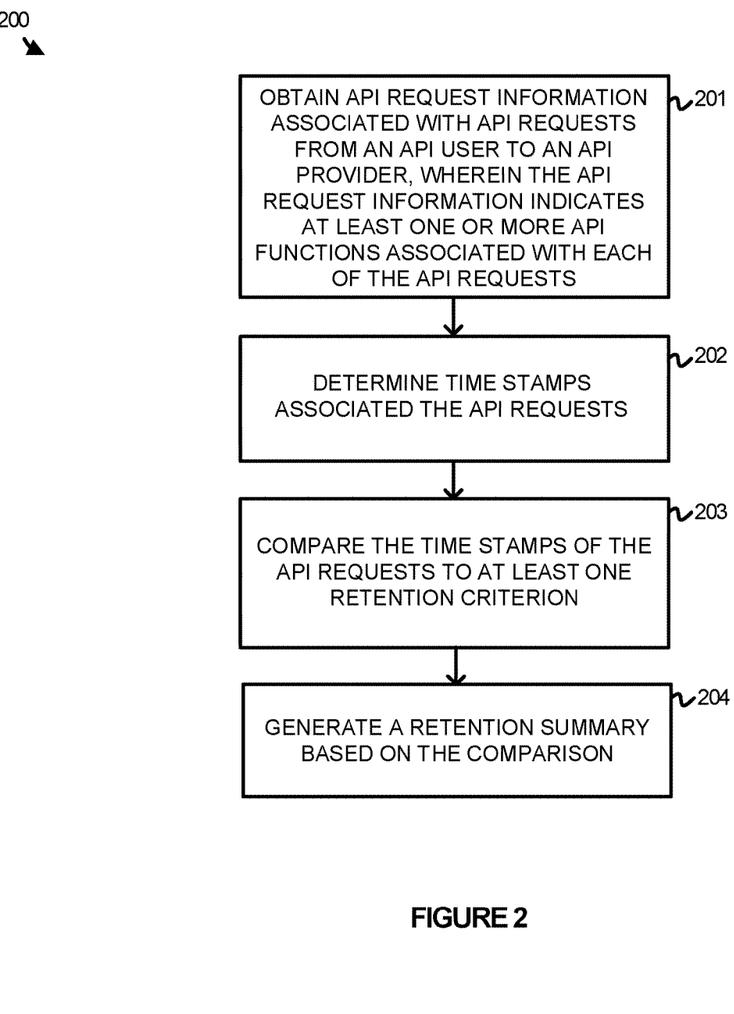
FIG. 2 illustrates an operation of a monitoring service to determine API provider retention according to an implementation.

FIG. 2 illustrates an operation 200 of a monitoring service to determine API provider retention according to an implementation. Operation 200 is referenced parenthetically in the paragraphs that follow with reference to systems and elements of computing environment 100 of FIG. 1.

As depicted, operation 200 includes obtaining (201) API request information associated with API requests from an API user to an API provider, wherein the API request information indicates at least one or more API functions associated with the API requests. The API request information may be provided by API provider 110 at periodic intervals, during downtime periods of requests to API provider 110, in response to a request from monitoring service 130, or at some other interval. In some implementations, API request information 152 may include at least a portion of the headers corresponding to API requests 150. This header information for the packets associated with API requests 150 may include an identifier for the user generating the request, a time stamp associated with the request, an identifier for the API function requested, or some other information related to the API request. In some examples, API request information 152 may include the entire header, however, API request information 152 may include attributes or portions of the header that are relevant to monitoring service 130.

As the API request information is obtained, monitoring service 130 further determines (202) time stamps associated with each of the API requests. In some implementations, monitoring service 130 may extract an API function identifier and associated the function identifier with a timestamp for the API user. In this manner, monitoring service 130 may generate sequencing information corresponding to when various API functions are requested by an API user. After determining the sequencing or time stamp information associated with the API requests, operation 200 may further compare (203) the time stamps of the API requests to at least one retention criterion associated with API provider 110.

In at least one example, an administrator associated with API provider 110 may define retention periods for users of the API provider service. These periods may comprise hours, days, weeks, or some other retention period. Additionally, the administrator may define a first API function that initiates the time period and a second API function that must be completed within the desired time period. For example, an administrator associated with API provider 110 may define that an API function to obtain data from a database must be implemented by an API user within a day after another API function to obtain data from the same database. The two API functions may be the same function or may be different API functions provided by API provider 110. In some examples, the retention definition from the administrator may indicate that any two functions implemented by a user within a defined time period may indicate that the user has been retained for that time period. Once one time period is completed and the API user has been identified as retained, a second time period may be initiated, and the monitoring service may determine whether the API user generates an API request during the second time period.

As monitoring service 130 compares the time stamps of the API requests to the at least one retention criterion, monitoring service 130 may further generate (204) summaries, such as summary 155, that can be provided to administrator 160. The summary may correspond to retention information about an individual API user or may provide retention information about multiple API users. In some examples, the summaries may be generated in response to a request from administrator 160, however, it should be understood that the summaries may be provided as an automated notification, wherein the notification may be provided as an email, a text message, a popup notification, or by some other means. The summaries may include graphs, tables, data structures, lists of statistics, natural language, or some other summary based on the comparison of the API function usage and the criteria defined by administrator 160. In at least one implementation, the summary may indicate retention of the API users as a function of time. This graph may provide information about each of the users individually or may group one or more of the users as a single entity to be represented in the graph. For example, API users that correspond to a first industry may be grouped together as a first entity, while API users that correspond to a second industry may be grouped together as a second entity. The graph may demonstrate the ratio or percentage of users in the entity that were retained over a particular time period. The summary may also provide information on the overall quantity of API function requests generated by each of the users during each of the time periods, the types of API function requests generated, the time periods (such as time of day) that the API is used by the users, or some other information regarding the retention of API users of API provider 110.

In some implementations, monitoring service 130 may generate an automated notification for administrator 160 when one or more criteria are met for the API function time stamps associated with API users 120-122. The criteria may correspond to a single API user or may correspond to a group of one or more API users. The criteria may correspond to a quantity of users that fail to meet retention criteria (e.g., a quantity of days retained using the API), a ratio of users that fail to meet retention criteria (e.g., a quantity of days retained using the API), or some other criteria. As an example, if monitoring service 130 determined that API users 120-122 had each not been retained after five days of using the API provider 110, monitoring service 130 may generate summary 155 that can be provided as a notification to administrator 160. The notification may indicate the API users that were not retained, the API functions that were used by the API users, information about any other API users associated with API provider 110, or some other information associated with the retention of the API users.

Figure 3:
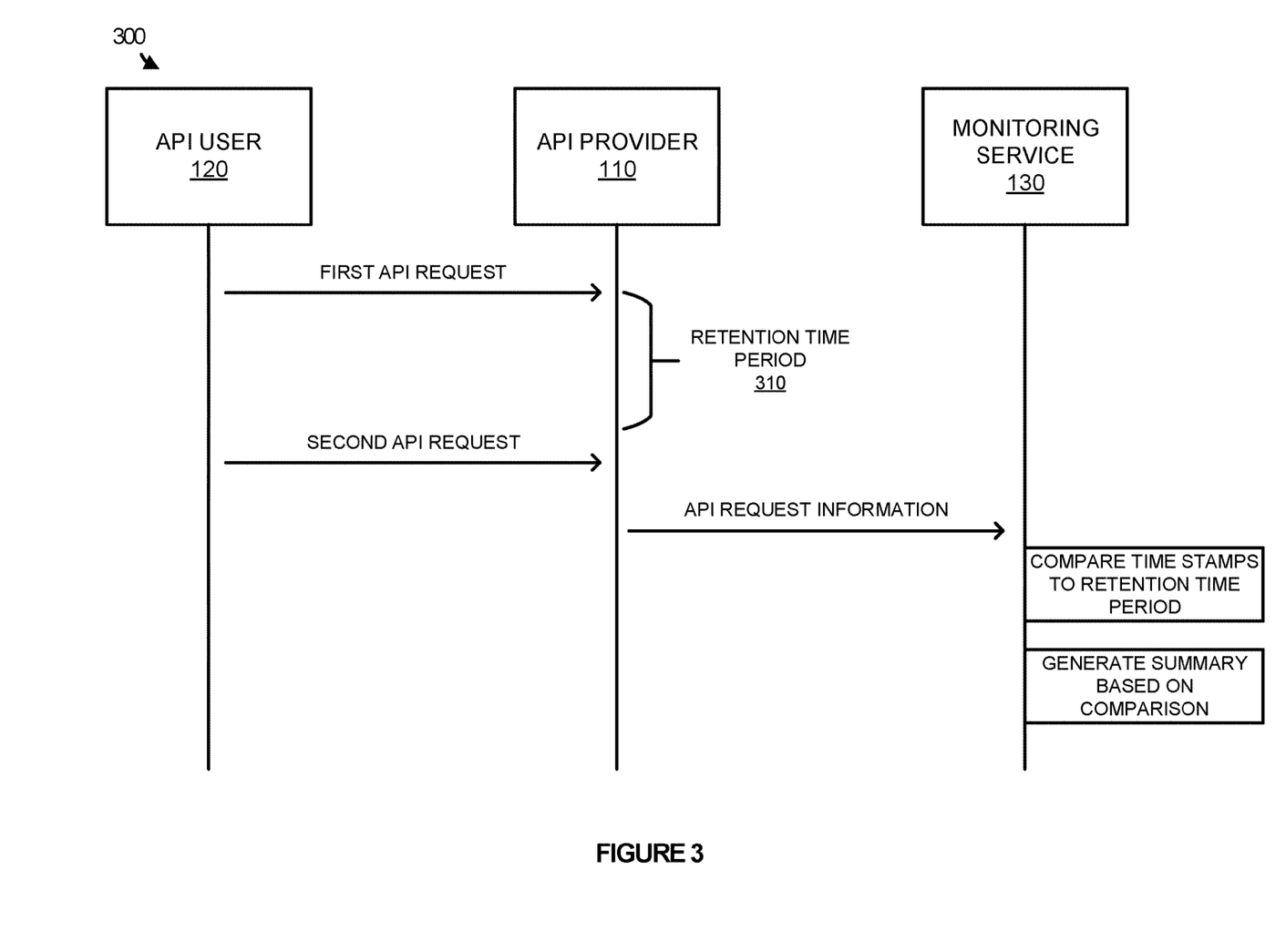
FIG. 3 illustrates a timing diagram to monitor API provider retention according to an implementation.

FIG. 3 illustrates a timing diagram 300 to monitor API provider retention according to an implementation. Timing diagram 300 includes API user 120, API provider 110, and monitoring service 130 from computing environment 100 of FIG. 1.

In operation, an administrator associated with API provider 110 may generate retention criteria that can be used to identify when and how API users are retained in computing environment 100. The retention criteria may indicate a first API function that can be used to trigger a retention time period, a length associated with the retention time period, a second API function that is required in the retention time period, or some other information. For example, an administrator associated with API provider 110 may define that a first API function may trigger retention time period 310. Additionally, the administrator may require that a second API function occur within the time period to indicate that the API user is retained. The time period may comprise an hour, a day, a week, or some other time period.

As depicted in timing diagram 300, API user 120 generates a first API request that is obtained by API provider 110, wherein the first API request triggers the start of retention time period 310. Once the time period is initiated, API provider 110 may determine whether a second API request is initiated by the user within retention time period 310. If the user generates the second API request within retention time period 310, then it may be determined that the user has been retained. In contrast, if the user does not generate a second API request within retention time period 310, which is demonstrated in FIG. 3, then it may be determined that API user 120 has not been retained.

In maintaining the retention information, API provider 110 may provide API request information to monitoring service 130 at various intervals, wherein the request information may indicate the API functions requested and time stamps associated with the requests. As the API request information is obtained by monitoring service 130, monitoring service 130 may compare the time stamps to the retention time period criteria associated with API provider 110. In particular, because the second API request occurs after retention time period 310, monitoring service 130 may determine that API user 120 was not retained from the first request. As a result, monitoring service 130 may generate a summary that indicates that API user 120 failed to satisfy the retention criteria or requirements. In some examples, the summary may correspond to a single user, however, monitoring service 130 may provide information about multiple users in some examples. In some implementations, the summary may be generated based on a request from an administrator associated with API provider 110 and monitoring service 130. In other implementations, the summary may be provided as a notification without a user request. The summary may provide a graph demonstrating user retention, a table demonstrating user retention, or some other summary of user retention.

Although demonstrated as using a single request in monitoring user retention, it should be understood that other information may be considered by monitoring service 130 in determining user retention. This may include the quantity of requests obtained during retention time period 310, the quantity of requests obtained during retention time period 310 in relation to another time period, or some other information. Although demonstrated using a single retention time period 310, it should be understood that retention time period 310 may repeated to determine the retention over multiple periods. In particular, following retention time period 310, if API user 120 generated the required API request during the initial time period, a second time period may be used to determine if the user was retained for another time period.

Figure 4:
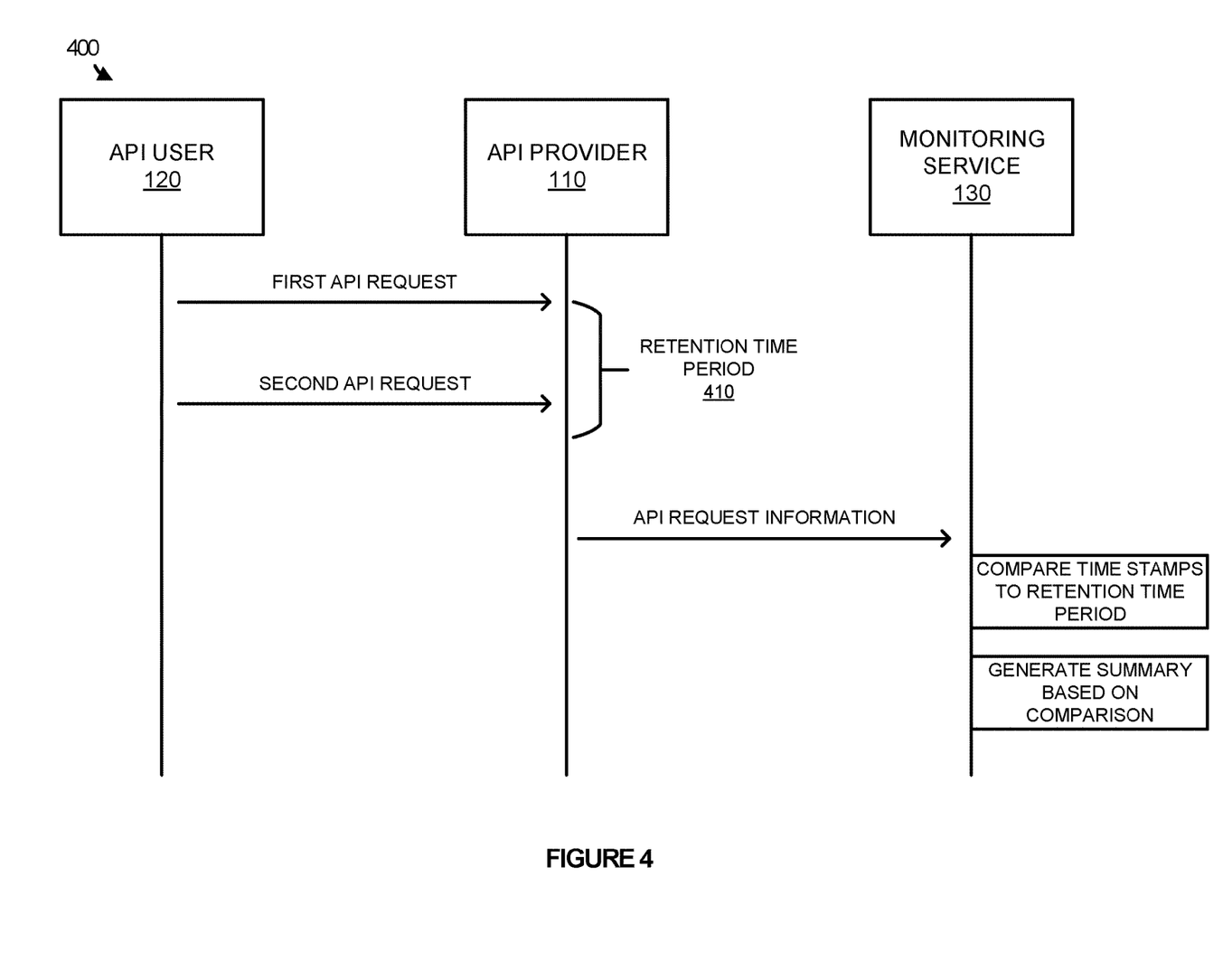
FIG. 4 illustrates a timing diagram to monitor API provider retention according to an implementation.

FIG. 4 illustrates a timing diagram 400 to monitor API provider retention according to an implementation. Timing diagram 400 includes API user 120, API provider 110, and monitoring service 130 from computing environment 100 of FIG. 1. Timing diagram 400 further includes retention time period 410.

In operation, an administrator associated with API provider 110 may generate retention criteria that can be used to identify when and how API users are retained in computing environment 100. The retention criteria may indicate a first API function that can be used to trigger a retention time period, a length associated with the retention time period, a second API function that is required in the retention time period, or some other information. For example, an administrator associated with API provider 110 may define that a first API function may trigger retention time period 410. Additionally, the administrator may require that a second API function occur within the time period to indicate that the API user is retained. The time period may comprise an hour, a day, a week, or some other time period.

As depicted in timing diagram 400, API user 120 generates a first API request that is obtained by API provider 110 and, subsequently, generates a second API request that is obtained within retention time period 410. As the requests are obtained by API provider 110, API provider 110 may identify API request information and communicate the API request information to monitoring service 130. The API request information may include at least a portion of the header information from packets obtained as the API requests, wherein the information may include a user identifier associated with the request, an API function identifier associated with the request, a time stamp associated with the request, or some other information. From the information, monitoring service 130 may compare the time stamps to the retention time period criteria defined by an administrator for API provider 110. Here, because the second API request is obtained by API provider prior to the expiration of retention time period 410, monitoring service 130 may determine that API user 120 has been retained for the time period. Monitoring service 130 may then generate a summary based on the comparison and provide the summary to an administrator associated with API provider 110 and monitoring service 130. The summary may indicate retention information associated with API user 120 or may provide information associated with multiple API users.

Although demonstrated in the example of FIG. 4 using a single time period, it should be understood that the time period may be iteratively repeated. For example, if retention time period represented an hour, after expiration of retention time period 410, a new time period may be initiated. During the new time period, monitoring service 130 may determine whether API user 120 continued to generate API requests to API provider 110. Additionally, while demonstrated as a single API request to cause monitoring service 130 to determine that API user 120 has been retained, it should be understood that a threshold quantity of API requests may be used to determine API user retention. As an example, a threshold may define that five API requests are required by an API user during a retention time period, such that the API user is considered retained. If the API user falls below the threshold quantity of requests, the API user may fail to be considered retained during that period.

Figure 5:
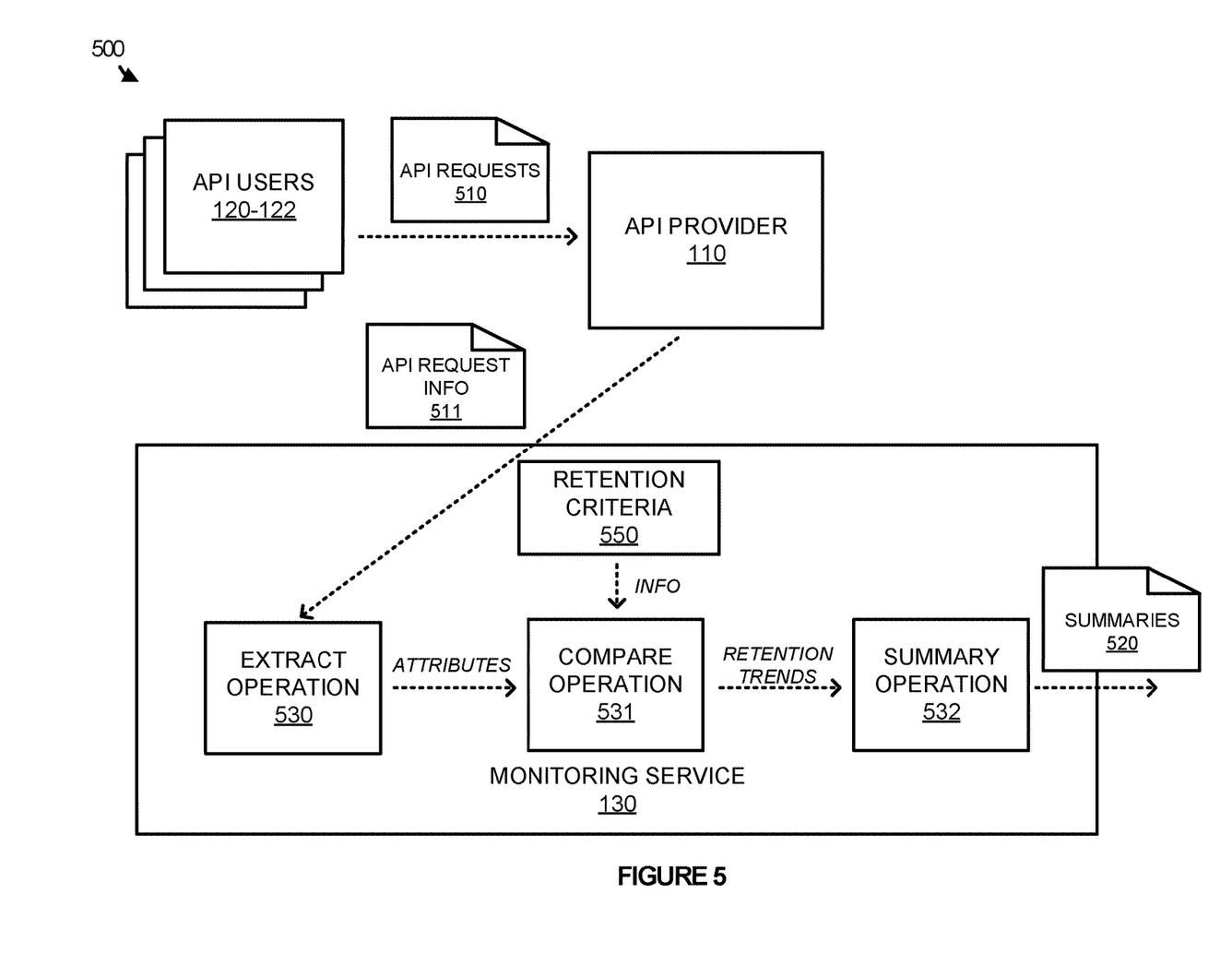
FIG. 5 illustrates an operational scenario of generating a summary of API user retention according to an implementation.

FIG. 5 illustrates an operational scenario 500 of generating a summary of API user retention according to an implementation. Operational scenario 500 includes API users 120-122, API provider 110 and monitoring service 130 from computing environment 100 of FIG. 1. Operational scenario 500 further includes API request 510, API request information 511, and summaries 520. Monitoring service 130 further includes operations 530-532 and retention criteria 550.

In operation, API users 120-122 generate API requests 510 that are provided as packets to API provider 110 using the internet. As the API requests are obtained and responded to by API provider 110, API provider 110 may further supply API request information 511, wherein the request information may include attributes derived from the header of the API request packets. When API request information 511 is received by monitoring service 130, monitoring service 130 and extract operation 530 may extract the relevant attributes from the API request information and provide the attributes to compare operation 531. The attributes may include a user identifier associated with each request, an API function type associated with each request, a time stamp associated with each request, or some other attribute associated with the request. Once extracted, compare operation 531 may compare at least a portion of the attributes to retention criteria 550. In some examples, retention criteria may define time periods for API functions to be used by an API user. In particular, the retention criteria may trigger a retention time period when a first API function is requested by an API user and if the API user uses one or more second API functions within the time period, the user may be considered retained for the time period. These time periods may then be followed by additional time periods to determine the retention length of the API user. If the API user fails to satisfy the criteria for a time period, then the user may be considered non-retained for that period. A new retention period may be started when the user returns, or the user may be added back to the previous retention length but indicate the lapse in usage.

In addition to comparing the attributes to retention criteria 550, retention trends developed from the comparison may be provided to summary operation 532 that generates summaries 520. In some examples, summaries 520 may include data structures indicating the retention of one or more API users as a function of time, summaries 520 may indicate trends of interest, such as frequent time when users are no longer retained by API provider 110, may indicate possible solutions to the retention issues, or may provide some other information.

Figure 6:
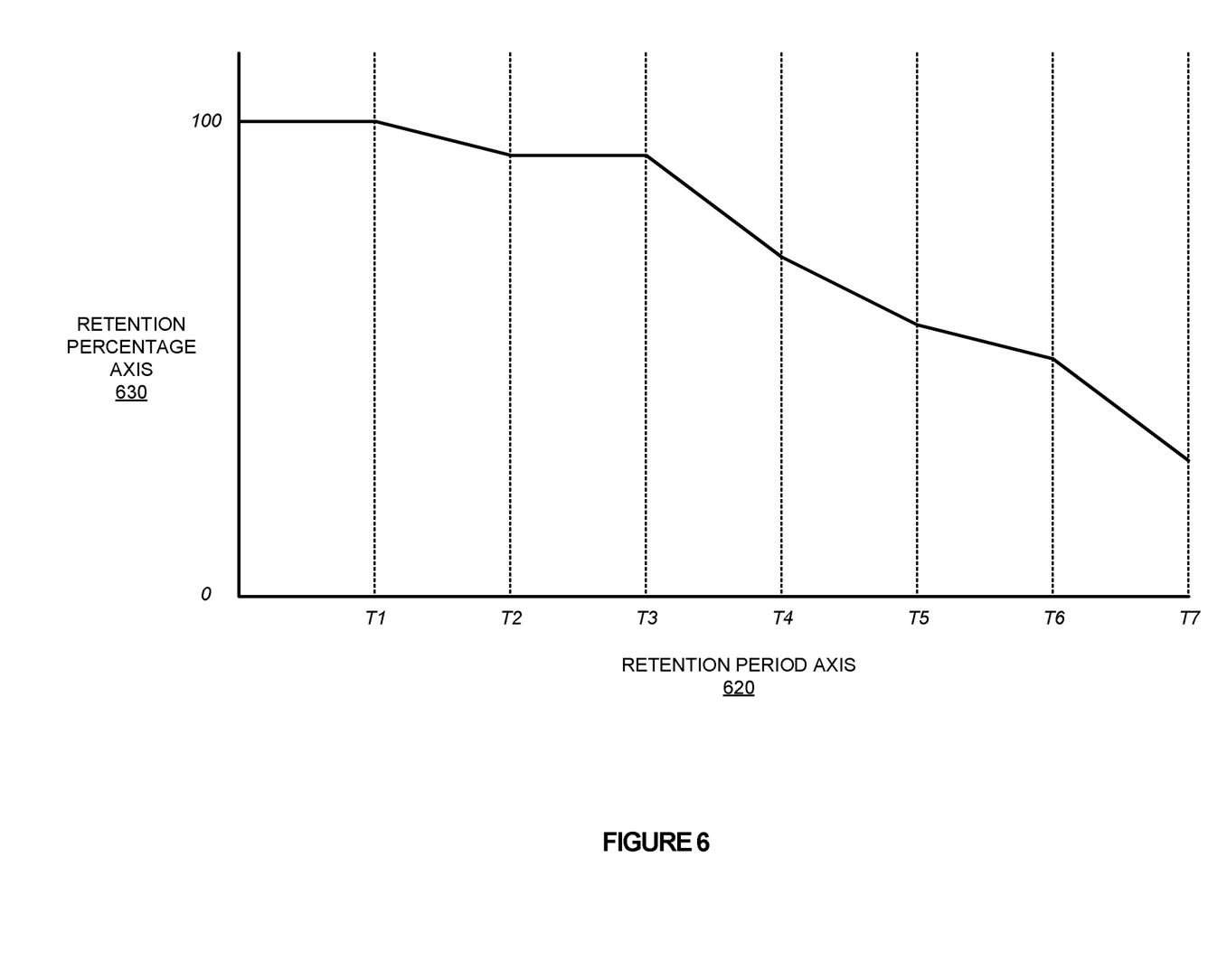
FIG. 6 illustrates a user interface summary of API user retention according to an implementation.

FIG. 6 illustrates a user interface 600 summary of API user retention according to an implementation. User interface 600 demonstrates a graph with retention period axis 620 and retention percentage axis 630. User interface 600 is one example of a summary that can be provided to an administrator of an API provider, although other examples may exist.

In the example of user interface 600, the retention of users is demonstrated as a percentage as a function of time periods. Retention period axis 620 includes periods T1, T2, T2 . . . T7, wherein the periods may correspond to hours, days, weeks, or some other interval. The users that correspond to the retention percentages may correspond to all users of the API service provider, a subset of users of the API service provider, or some other group of users. For example, API users may be separated based on their industry, and the graph of user interface 600 may represent a single industry.

Although not demonstrated in the example of FIG. 6, it should be understood that a user interface may further demonstrate trends of interest. In particular, as the retention of users are identified for an API provider, the monitoring service may determine when the retention satisfies criteria to trigger a trend of interest. The trend of interest may include a quantity of users not being retained, a percentage of users not being retained, a drop in the quantity of API requests by each of the users or some other information. The monitoring system may also attempt to determine causes for the trend of interest, wherein the cause may be associated with a version change to the API, a cost change to the API, or some other event that corresponds to the drop in API user retention.

Figure 7:
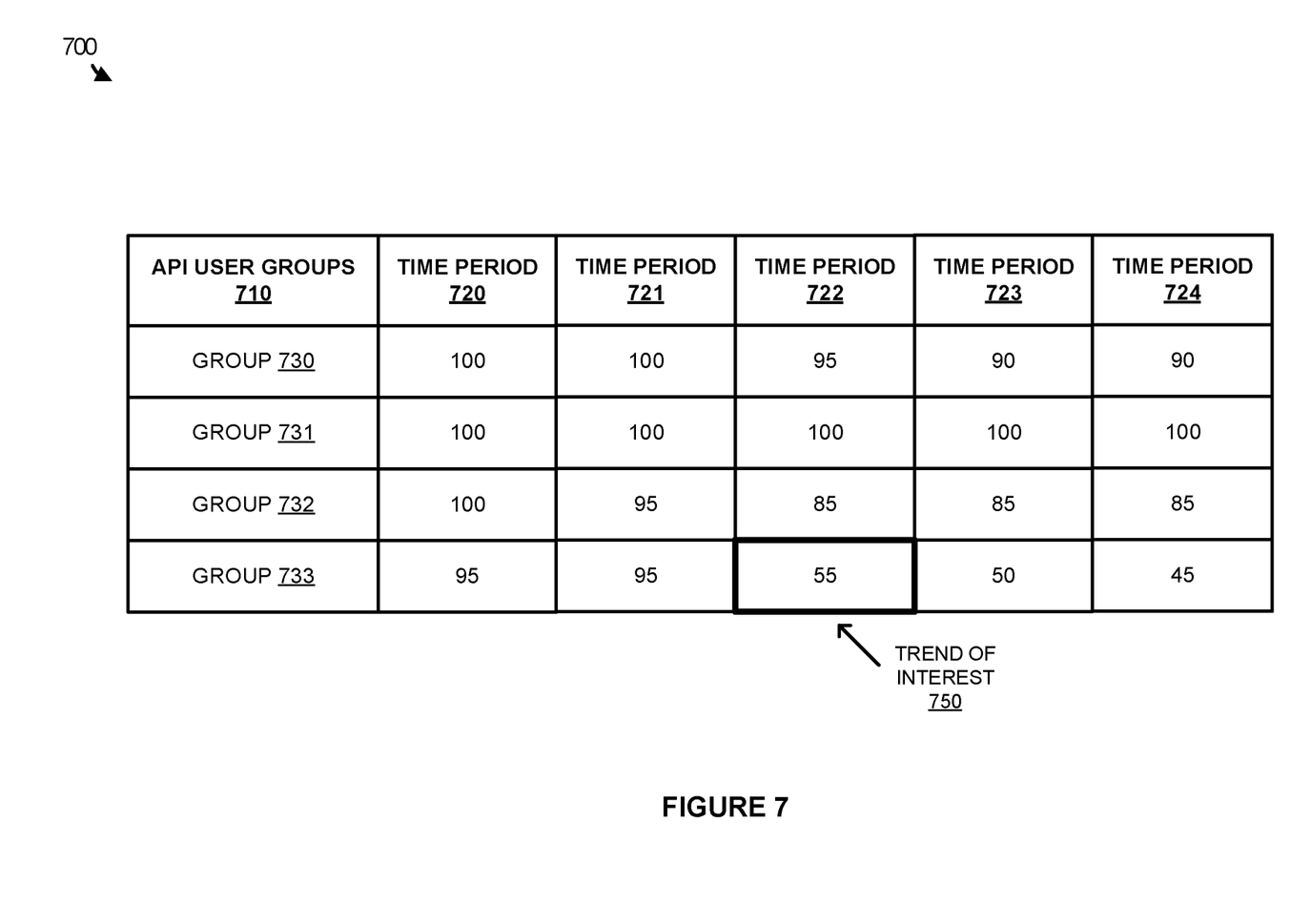
FIG. 7 illustrates a data structure to identify API user retention trends according to an implementation.

FIG. 7 illustrates a data structure 700 to identify API user retention trends according to an implementation. Data structure 700 is representative of a data structure that corresponds to retention data for users of an API provider. Data structure 700 includes API user groups 710 with groups 730-733 and time periods 720-724. Time periods 720-724 may represent an hour, a week, a day, or some other time period.

As described herein, a monitoring service may obtain API request information associated with an API provider and use the API request information to determine how API users are retained for the API provider. In some implementations, user groups may be defined that each include one or more users that can be grouped together based on initial request type to the API provider, industry, country, software development kit used to interact with the API provider, or some other grouping criteria. In the example of data structure 700, a table is used to demonstrate the retention of groups 730-733 as a function of time periods 720-724. The retention of each user may be based on whether the user generated one or more requests in each time period of time periods 720-724. For example, a criterion for an API user to be active may require that the API user generate at least three API requests during a particular time period. If the API user fails to generate the required requests, then the API user may not be considered retained for that period. If the user again uses the API to sufficiently qualify for a retention period, the user retention may start again at time period 720 and progress to other time periods upon expiration of time period 720.

In some examples, the monitoring service may be used to identify trends of interest in the data of the API users. The trends of interest may correspond to specific users or may correspond to a group of users. Here, group 733 at time period 722 is identified as trend of interest 750. The trend of interest may be identified based on a total drop from the initial retention of the group, from the percentage drop between time periods, or from some other statistical relationship for the retention of the users. In some examples, when a trend of interest is identified, the monitoring service may attempt to correlate the drop to a change or issue within the API configuration. This change could be an update to a version of the API, a downtime of the API, feedback from other API users, or some other correlation.

Although data structure 700 is one example for displaying the retention of users, it should be understood that other examples may exist. These may include graphs, natural language, or some other summary that indicates the retention of one or more API users, including various combinations thereof.

Figure 8:
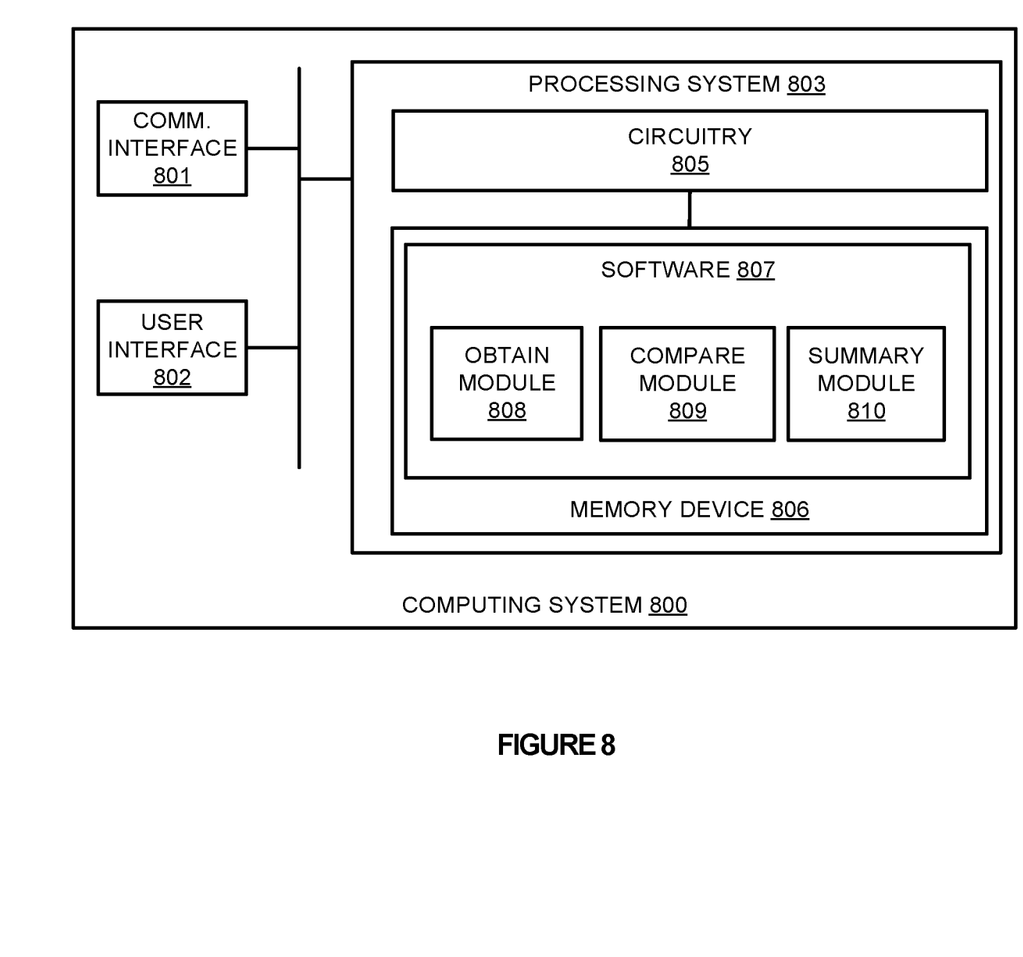
FIG. 8 illustrates a monitoring computing system according to an implementation.

FIG. 8 illustrates a computing system 800 according to an implementation. Computing system 800 is representative of any computing system or systems with which the various operational architectures, processes, scenarios, and sequences disclosed herein for a management system may be implemented. Computing system 800 is an example monitoring service 130, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In at least one implementation, communication interface 801 may be used to communicate with one or more computing systems that act as an API provider that receives API requests from API users. Communication interface 801 may further communicate with one or more console devices that correspond to administrators associated with the API provider. The console devices may comprise smartphones, tablets, computers, or some other console device.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples. In some examples, user interface 802 may be used to provide summaries to administrators associated with the API provider.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes obtain module 808, sequence module 809, and trend module 810, although any number of software modules may provide a similar operation. Operating software 807 may further include an operating system, utilities, drivers, network interfaces, applications, or some other type of software. When executed by processing circuitry 805, operating software 807 directs processing system 803 to operate computing system 800 as described herein.

In one implementation, obtain module 808 directs processing system 803 to obtain API request information associated with an API provider. From the API request information, compare module 809 directs processing system 803 to compare attributes derived from the API request information to retention criteria to determine a retention of API users to the API provider. In some implementations, the extracted attributes may indicate a user associated with an API request, an API function associated with the API request, a time stamp associated with the API request, or some other information associated with each API request. In some examples, compare module 809 may determine whether an API user has been retained based on whether the API user uses two or more API function requests during a time period. For instance, a first API function request may be used to initiate the period and compare module 809 may determine whether a required one or more additional API function requests are made during the time period. If the requests are made during the required period, then compare module 809 may identify that the API user is retained for that period. The process may then be repeated for a following periods to continue determining the retention of the user. Thus, if the periods were representative of an hour, after first use of the API provider by an API user, compare module 809 may determine the retention of the user for each hour following the first use.

Once compare module 809 has determined the retention information associated with the various users of the API provider, summary module 810 may generate summaries based on the retention information for the API users. The summaries may be generated automatically or in response to a request from an administrator. The summaries may provide graphs, tables, or other data structures that indicate the retention of API users to the API providers. The summaries may include or identify trends of interest based on the retention of API users to the API provider. In some examples, to identify a trend of interest, compare module 809 may determine when the retention of users satisfy at least one criterion, wherein the criterion may comprise a length of retention, a rate at which users fail to be retained, or some other criteria. For example, a trend of interest may be identified based on fifty percent of API users failing to be retained after the fourth day of using the API. Consequently, a summary may be generated that indicates the trend of interest. Additionally, the summary may indicate possible correlating causes for the drop off, such as a change in version of the API, downtime periods of the API, or some other correlating event that could be identified based on the time stamps associated with the API requests.

Figure 9:
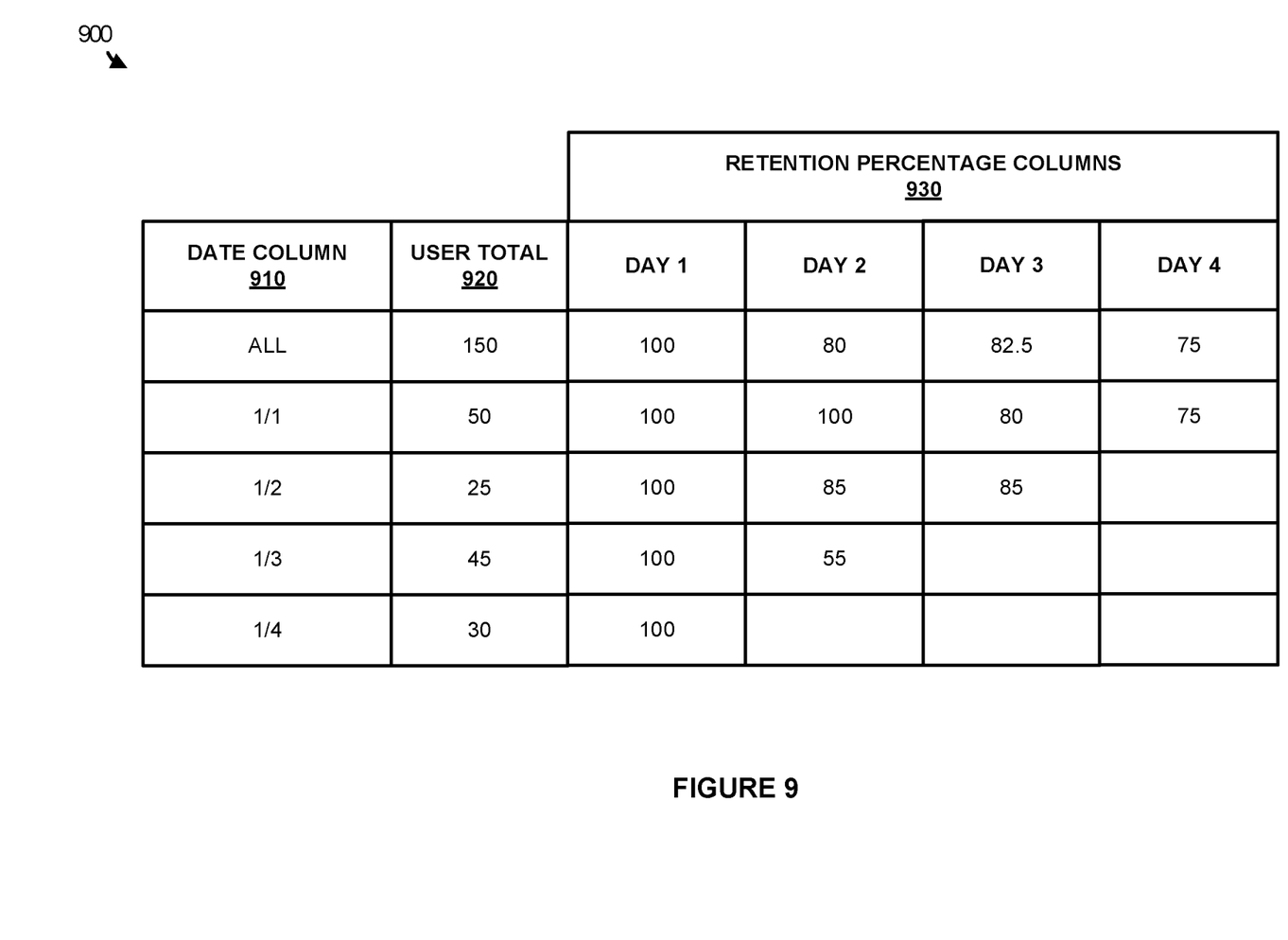
FIG. 9 illustrates a data structure to identify API user retention trends according to an implementation.

FIG. 9 illustrates a data structure 900 to identify API user retention trends according to an implementation. Data structure 900 includes date column 910 for a plurality of dates, user total 920 for a total number of users that started on each particular date, and retention percentage columns 930 that demonstrate the retention of users as a function of the number of days since they started use of an API provider. In some implementations, data structure 900 may be displayed to the user, wherein the data structure may further identify trends of interest. These trends of interest may include a heat map, which can use colors, shading, and the like to define trends in the percentage of users retained as a function of time, may comprise highlighting to identify dates of interest, or may comprise some other notification to define a trend of interest in the retention of users for an API provider.

In some implementations, data structure 900 may represent all of the users associated with an API provider, however, it should be understood that any data structure for an API monitoring service may correspond to a subset of the users. These users may be separated based on industry, based on the version of the API used by the users, based on the type of software development kit they are using to interact with the API provider, or based on some other consideration. In some examples, a user of the API monitoring service may further separate users that are new within a particular time period from users that are non-new during the particular time period. Advantageously, this may permit the user to determine the retention information associated with only the newer users of the API provider during the desired time period.

Although demonstrated in the example of FIG. 9 as using a period of days to represent the API retention of the API users, it should be understood that any other period may be used. These periods may include hours, weeks, months, and the like. In some examples, the periods may be specified by a user associated with the API monitoring service and the data structure may be generated in response to the specification.

Returning to the elements of FIG. 1, API users 120-122, API provider 110, and monitoring service 130 may each comprise communication interfaces, network interfaces, processing systems, computer systems, microprocessors, storage systems, storage media, or some other processing devices or software systems and can be distributed among multiple devices. Examples of API users 120-122, API provider 110, and monitoring service 130 can include software such as an operating system, logs, databases, utilities, drivers, networking software, and other software stored on a computer-readable medium. API users 120-122, API provider 110, and monitoring service 130 may comprise, in some examples, one or more server computing systems, desktop computing systems, laptop computing systems, or any other computing system, including combinations thereof. Although demonstrated as separate from API provider 110, it should be understood that monitoring service 130 may execute on the same computing system or systems as API provider 110.

Communication between API users 120-122, API provider 110, and monitoring service 130 may use metal, glass, optical, air, space, or some other material as the transport media. Communication between API users 120-122, API provider 110, and monitoring service 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between API users 120-122, API provider 110, and monitoring service 130 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
    obtaining application programming interface (API) request information associated with API requests from an API user to an API provider;
    determining time stamps associated with the API requests based on the API request information;
    comparing the time stamps of the API requests to at least one retention criterion to determine a retention of the API user to the API provider as a function of time, wherein the retention indicates whether the API user uses the API provider for consecutive time periods; and
    generating a retention summary based on the retention of the API user.

2. The method of claim 1, wherein the at least one retention criterion comprises a time period for the API user to generate a first API request with a first API function and generate a second API request with a second API function.

3. The method of claim 1, wherein the retention summary comprises a data structure, and wherein the method further comprises providing a display of the retention summary to an administration computing system.

4. The method of claim 1, wherein comparing the time stamps of the API requests to at least one retention criterion comprises:
    (a) identifying a first API request of the API requests that corresponds to a first API function;
    (b) identifying a second API request of the API requests that corresponds to a second API function;
    (c) determining that the API user has been retained when the first API request and the second API request occur within a first time period;
    (d) if the API user is retained, repeating steps (a)-(c) with a second time period in place of the first time period, wherein the second time period follows the first time period.

5. The method of claim 1 further comprising:
    obtaining second API request information associated with second API requests from one or more additional API users to the API provider;
    determining second time stamps associated with the second API requests based on the second API request information;
    comparing the second time stamps of the API requests to the at least one retention criterion to determine a retention of the one or more additional API users as a function of time, wherein the retention of the one or more additional API users indicates whether the one or more additional API users use the API provider for consecutive time periods; and
    wherein the retention summary is further generated based on the retention of the one or more additional API users.

6. The method of claim 5, wherein the retention summary comprises at least a graph, and wherein the graph indicates the retention of the API user and the retention of the one or more additional API users as a function of time.

7. The method of claim 5 further comprising determining that the retention of the API user and the retention of the one or more additional API users satisfy a trend of interest, and wherein the retention summary indicates the trend of interest.

8. The method of claim 1 further comprising:
obtaining a request to generate the retention summary; and
generating the retention summary in response to the request.

9. A computing apparatus comprising:
a storage system;
a processing system operatively coupled to the storage system; and
program instructions stored on the storage system that, when executed by the processing system, direct the processing system to:
  obtain application programming interface (API) request information associated with API requests from an API user to an API provider;
  time stamps associated with the API requests based on the API request information;
  compare the time stamps of the API requests to at least one retention criterion to determine a retention of the API user to the API provider as a function of time over time, wherein the retention indicates whether the API user uses the API provider for consecutive time periods; and
  generate a retention summary based on the retention of the API user.

10. The computing apparatus of claim 9, wherein the at least one retention criterion comprises a time period for the API user to generate a first API request with a first API function and generate a second API request with a second API function.

11. The computing apparatus of claim 9, wherein the retention summary comprises a data structure, and wherein the method further comprises providing a display of the retention summary to an administration computing system.

12. The computing apparatus of claim 9, wherein comparing the time stamps of the API requests to at least one retention criterion comprises:
  (a) identifying a first API request of the API requests that corresponds to a first API function;
  (b) identifying a second API request of the API requests that corresponds to a second API function;
  (c) determining that the API user has been retained when the first API request and the second API request occur within a first time period;
  (d) if the API user is retained, repeating steps (a)-(c) with a second time period in place of the first time period, wherein the second time period follows the first time period.

13. The computing apparatus of claim 9, wherein the program instructions further direct the processing system to:
  obtain second API request information associated with second API requests from one or more additional API users to the API provider;
  determine second time stamps associated with the second API requests based on the second API request information;
  compare the second time stamps of the API requests to the at least one retention criterion to determine a retention of the one or more additional API users as a function of time, wherein the retention of the one or more additional API users indicates whether the one or more additional API users use the API provider for consecutive time periods; and
  wherein the retention summary is further generated based on the retention of the one or more additional API users.

14. The computing apparatus of claim 13, wherein the retention summary comprises at least a graph, and wherein the graph indicates the retention of the API user and the retention of the one or more additional API users as a function of time.

15. The computing apparatus of claim 13, wherein the program instructions further direct a processing system to determine that the retention of the API user and the retention of the one or more additional API users satisfy a trend of interest, and wherein the retention summary indicates the trend of interest.

16. The computing apparatus of claim 9, wherein the program instructions further direct the processing system to:
  obtain a request to generate the retention summary; and
  generate the retention summary in response to the request.

17. A method comprising:
  obtaining application programming interface (API) request information associated with API requests from a plurality of API users to an API provider;
  determining time stamps associated with the API requests based on the API request information;
  comparing the time stamps of the API requests to at least one retention criterion to determine a retention of the plurality of API users to the API provider as a function of time, wherein the retention indicates whether the plurality of API users use the API provider for consecutive time periods;
  determine that the retention of the plurality of API users satisfy a trend of interest; and
  generating a retention summary based on the retention, wherein the retention summary indicates the trend of interest.

18. The method of claim 17, wherein the retention summary comprises at least a graph, and wherein the graph indicates the retention of the plurality of API users as a function of time.

19. The method of claim 17 further comprising:
  obtaining a request to generate the retention summary; and
  generating the retention summary in response to the request.

20. The method of claim 17 further comprising providing a display of the retention summary to an administration computing system.

* * * * *

UNITED STATES PATENT AND TRADEMARK OFFICE
CERTIFICATE OF CORRECTION

PATENT NO. : 10,990,455 B2
APPLICATION NO. : 16/575084
DATED : April 27, 2021
INVENTOR(S) : Gilling et al.

Page 1 of 1

It is certified that error appears in the above-identified patent and that said Letters Patent is hereby corrected as shown below:

In the Claims

Column 13, Claim 9, Line 21, delete "over time"

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*